United States Patent
Yang et al.

(10) Patent No.: US 11,076,167 B2
(45) Date of Patent: Jul. 27, 2021

(54) DEVICE AND METHOD FOR CODING VIDEO DATA

(71) Applicant: FG Innovation Company Limited, Tuen Mun (HK)

(72) Inventors: Yu-Chiao Yang, Hsinchu (TW); Po-Han Lin, Taipei (TW)

(73) Assignee: FG Innovation Company Limited, Tuen Mun (HK)

(*) Notice: Subject to any disclaimer, the term of this patent is extended or adjusted under 35 U.S.C. 154(b) by 0 days.

(21) Appl. No.: 16/906,351

(22) Filed: Jun. 19, 2020

(65) Prior Publication Data
US 2020/0404313 A1   Dec. 24, 2020

Related U.S. Application Data

(60) Provisional application No. 62/865,438, filed on Jun. 24, 2019.

(51) Int. Cl.
*H04N 11/02* (2006.01)
*H04N 19/51* (2014.01)
*H04N 19/176* (2014.01)

(52) U.S. Cl.
CPC ............ *H04N 19/51* (2014.11); *H04N 19/176* (2014.11)

(58) Field of Classification Search
CPC ..................................... H04N 19/51
USPC ...................... 375/240.01–240.29
See application file for complete search history.

(56) References Cited

U.S. PATENT DOCUMENTS

| | | | |
|---|---|---|---|
| 2006/0083440 A1* | 4/2006 | Chen | H04N 5/272 382/284 |
| 2011/0242339 A1* | 10/2011 | Ogawa | G06T 7/285 348/208.4 |
| 2017/0347116 A1* | 11/2017 | Lin | H04N 19/157 |
| 2018/0184126 A1* | 6/2018 | Zhang | H04N 19/137 |
| 2018/0192069 A1* | 7/2018 | Chen | H04N 19/51 |
| 2019/0110064 A1* | 4/2019 | Zhang | H04N 19/109 |
| 2019/0238843 A1* | 8/2019 | Filippov | H04N 19/107 |
| 2019/0273943 A1* | 9/2019 | Zhao | H04N 19/176 |

\* cited by examiner

*Primary Examiner* — Leron Beck
(74) *Attorney, Agent, or Firm* — ScienBiziP, P.C.

(57) ABSTRACT

A method of decoding a bitstream by an electronic device is provided. An image frame is received from the bitstream. A block unit is determined from the received image frame. A plurality of model parameters is derived based on motion information of a plurality of neighboring blocks neighboring the block unit. An intermediate block is derived for a sub-block in the block unit based on the plurality of model parameters. A vector formula is determined based on the plurality of model parameters, and at least one vector value is calculated based on the vector formula for at least one sampling position in the sub-block. The at least one vector value is compared with a threshold to determine whether the intermediate block is adjusted based on the vector formula to generate a predicted block. The sub-block is reconstructed based on the predicted block.

20 Claims, 8 Drawing Sheets

DEVICE AND METHOD FOR CODING VIDEO DATA

CROSS-REFERENCE TO RELATED APPLICATION(S)

The present disclosure claims the benefit of and priority to U.S. Provisional Patent Application Ser. No. 62/865,438, filed on Jun. 24, 2019, entitled "Threshold for Prediction Refinement with Optical Flow" (hereinafter referred to as "'438 provisional"). The disclosure of the '438 provisional is hereby incorporated fully by reference into the present disclosure.

FIELD

The present disclosure generally relates to video coding, and more particularly, to techniques for disabling an adjustment to an initial prediction result for predicting a block unit in an image frame.

BACKGROUND

Inter prediction is a coding tool in a video coding method. In a conventional video coding method, an encoder and a decoder may adjust an inter prediction result by a vector difference for each of a plurality of block components of a sub-block in a block unit. The vector differences may be rounded by a rounded parameter. If all of the vector differences of the sub-block are too small such that each of the rounding vector differences is a zero vector, the prediction result may be identical to the adjusted result and remain unchanged and the adjusting process may become a redundant process. Therefore, the encoder and the decoder need to check whether or not the adjustment is disabled.

SUMMARY

The present disclosure is directed to a device and method for disabling an adjustment to an initial prediction result by comparing at least one vector value with a threshold.

In a first aspect of the present disclosure, a method for decoding a bitstream by an electronic device is provided. The method comprises receiving an image frame of the bitstream and determining a block unit from the received image frame; deriving a plurality of model parameters based on motion information of a plurality of neighboring blocks neighboring the block unit; deriving, for a sub-block in the block unit, an intermediate block based on the plurality of model parameters; determining a vector formula based on the model parameters; calculating at least one vector value based on the vector formula for at least one sampling position in the sub-block; comparing the at least one vector value with a threshold; determining, based on the comparison, whether the intermediate block is adjusted; generating a predicted block based on the vector formula when the intermediate block is adjusted; and reconstructing the sub-block based on the predicted block.

In a second aspect of the present disclosure, a method for decoding a bitstream by an electronic device is provided. The method comprises receiving an image frame of the bitstream and determining a block unit from the received image frame; deriving a plurality of model parameters based on motion information of a plurality of neighboring blocks neighboring the block unit; deriving, for a sub-block in the block unit, an intermediate block based on the plurality of model parameters; determining a vector formula based on the model parameters; selecting a sampling position in the sub-block and calculating a vector value based on the sampling position; adjusting the intermediate block based on the vector formula to generate a predicted block when the vector value is greater than a threshold; and reconstructing the sub-block based on the predicted block.

BRIEF DESCRIPTION OF THE DRAWINGS

Aspects of the disclosure are best understood from the following detailed description when read with the accompanying figures. Various features are not drawn to scale and dimensions of various features may be arbitrarily increased or reduced for clarity of discussion.

DETAILED DESCRIPTION

Figure 1:
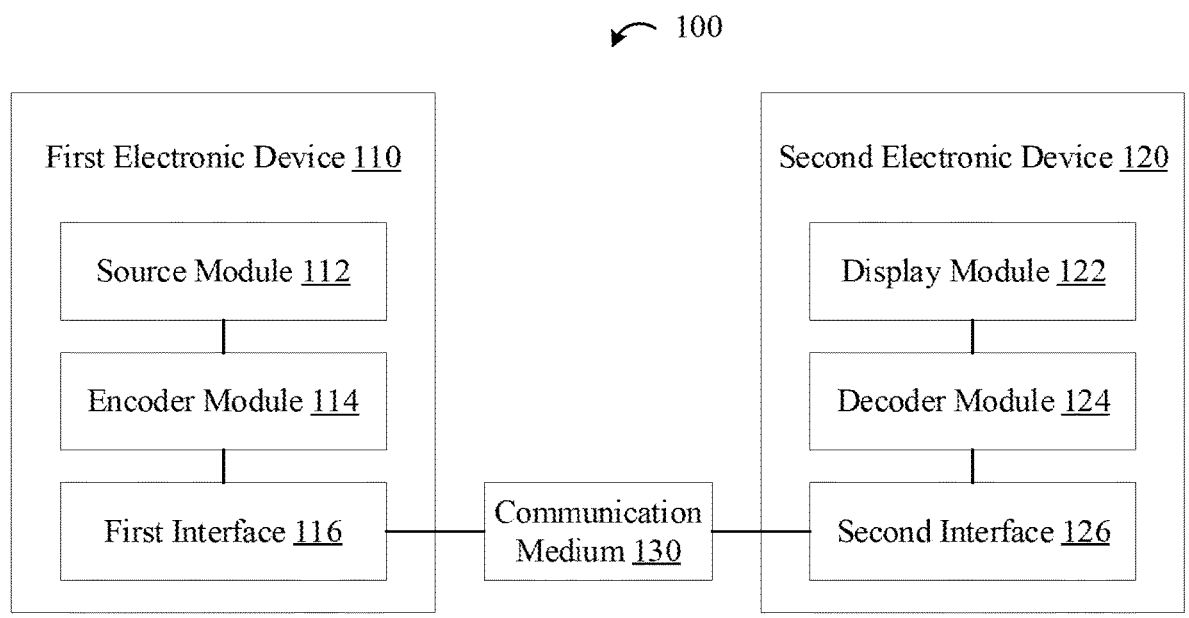
FIG. 1 illustrates a block diagram of an example system configured to encode and decode video data according to an example implementation of the present disclosure.

The following description contains specific information related to example implementations in the present disclosure. The drawings in the present disclosure and their accompanying detailed description are directed to merely example implementations. However, the present disclosure is not limited to merely these example implementations. Other variations and implementations of the present disclosure will occur to those skilled in the art.

Unless noted otherwise, like or corresponding elements among the figures may be indicated by like or corresponding reference numerals. The drawings and illustrations in the present disclosure are generally not to scale and are not intended to correspond to actual relative dimensions.

For the purpose of consistency and ease of understanding, like features are identified (although, in some examples, not shown) by numerals in the exemplary figures. However, the features in different implementations may differ in other respects and shall not be narrowly confined to what is shown in the figures.

The description uses the phrases "in one implementation," or "in some implementations," may refer to one or more of the same or different implementations. The term "coupled" is defined as connected, whether directly or indirectly, through intervening components and is not necessarily limited to physical connections. The term "comprising" means "including, but not necessarily limited to" and specifically indicates open-ended inclusion or membership in the so-described combination, group, series and the equivalent.

For purposes of explanation and non-limitation, specific details such as functional entities, techniques, protocols, and standards are set forth for providing an understanding of the disclosed technology. In other examples, detailed description of well-known methods, technologies, systems and architectures are omitted so as not to obscure the description with unnecessary details.

Persons skilled in the art will immediately recognize that any disclosed coding function(s) or algorithm(s) described in the present disclosure may be implemented by hardware, software or a combination of software and hardware. Described functions may correspond to modules may be software, hardware, firmware, or any combination thereof.

A software implementation may include computer executable instructions stored on computer readable medium such as memory or other type of storage devices. For example, one or more microprocessors or general-purpose computers with communication processing capability may be programmed with executable instructions and performs the disclosed function(s) or algorithm(s).

The microprocessors or general-purpose computers may be formed of applications specific integrated circuitry (ASIC), programmable logic arrays, and/or using one or more digital signal processors (DSPs). Although some of the disclosed implementations are oriented to software installed and executing on computer hardware, alternative implementations implemented as firmware or as hardware or combination of hardware and software are well within the scope of the present disclosure. The computer readable medium includes but is not limited to random access memory (RAM), read only memory (ROM), erasable programmable read-only memory (EPROM), electrically erasable programmable read-only memory (EEPROM), flash memory, compact disc read-only memory (CD ROM), magnetic cassettes, magnetic tape, magnetic disk storage, or any other equivalent medium capable of storing computer-readable instructions.

FIG. 1 illustrates a block diagram of a system 100 configured to encode and decode video data according to an example implementation of the present disclosure. The system 100 includes a first electronic device 110, a second electronic device 120, and a communication medium 130. The first electronic device 110 may be a source device including any device configured to encode video data and transmit encoded video data to the communication medium 130. The second electronic device 120 may be a destination device including any device configured to receive encoded video data via the communication medium 130 and to decode encoded video data.

In at least one implementation, the first electronic device 110 may communicate via wire or wirelessly with the second electronic device 120 via the communication medium 130. The first electronic device 110 may include a source module 112, an encoder module 114, and a first interface 116. The second electronic device 120 may include a display module 122, a decoder module 124, and a second interface 126. The first electronic device 110 may be a video encoder and the second electronic device 120 may be a video decoder.

In at least one implementation, the first electronic device 110 and/or the second electronic device 120 may be a mobile phone, a tablet, a desktop, a notebook, or other electronic devices. FIG. 1 merely illustrates one example of the first electronic device 110 and the second electronic device 120. The first electronic device 110 and second electronic device 120 in other implementations may include more or less components than illustrated or have a different configuration of the various components.

In at least one implementation, the source module 112 may include a video capture device to capture a new video, a video archive to store previously captured video, and/or a video feed interface to receive video from a video content provider. The source module 112 may generate computer graphics-based data as the source video or generate a combination of live video, archived video, and computer-generated video as the source video. The video capture device may be a charge-coupled device (CCD) image sensor, a complementary metal-oxide-semiconductor (CMOS) image sensor, or a camera.

In at least one implementation, the encoder module 114 and the decoder module 124 may each be implemented as any of a variety of suitable encoder/decoder circuitry such as one or more microprocessors, a central processing unit (CPU), a graphic processing unit (GPU), a system on chip (SoC), digital signal processors (DSPs), application specific integrated circuits (ASICs), field programmable gate arrays (FPGAs), discrete logic, software, hardware, firmware or any combinations thereof. When implemented partially in software, a device may store instructions for the software in a suitable, non-transitory computer-readable medium and execute the instructions in hardware using one or more processors to perform the disclosed methods. In at least one implementation, each of the encoder module 114 and the decoder module 124 may be included in one or more encoders or decoders, any of which may be integrated as part of a combined encoder/decoder (CODEC) in a device.

In at least one implementation, the first interface 116 and the second interface 126 may utilize customized protocols or follow existing standards or de facto standards including, but not limited to, Ethernet, IEEE 802.11 or IEEE 802.15 series, Wireless USB or telecommunication standards including, but not limited to, GSM, CDMA2000, TD-SCDMA, WiMAX, 3GPP-LTE or TD-LTE. In at least one implementation, the first interface 116 and the second interface 126 may each include any device configured to transmit and/or store a compliant video bitstream via the communication medium 130 and to receive the compliant video bitstream via the communication medium 130.

In at least one implementation, the first interface 116 and the second interface 126 may include a computer system interface that enables a compliant video bitstream to be stored on a storage device or to be received from the storage device. For example, the first interface 116 and the second interface 126 may include a chipset supporting Peripheral Component Interconnect (PCI) and Peripheral Component Interconnect Express (PCIe) bus protocols, proprietary bus protocols, Universal Serial Bus (USB) protocols, I2C, or any other logical and physical structure that may be used to interconnect peer devices.

In at least one implementation, the display module 122 may include a display using liquid crystal display (LCD) technology, plasma display technology, organic light emitting diode (OLED) display technology, or light emitting polymer display (LPD) technology with other display technologies used in other implementations. The display module 122 may include a high-definition display or an ultra-high definition display.

Figure 2:
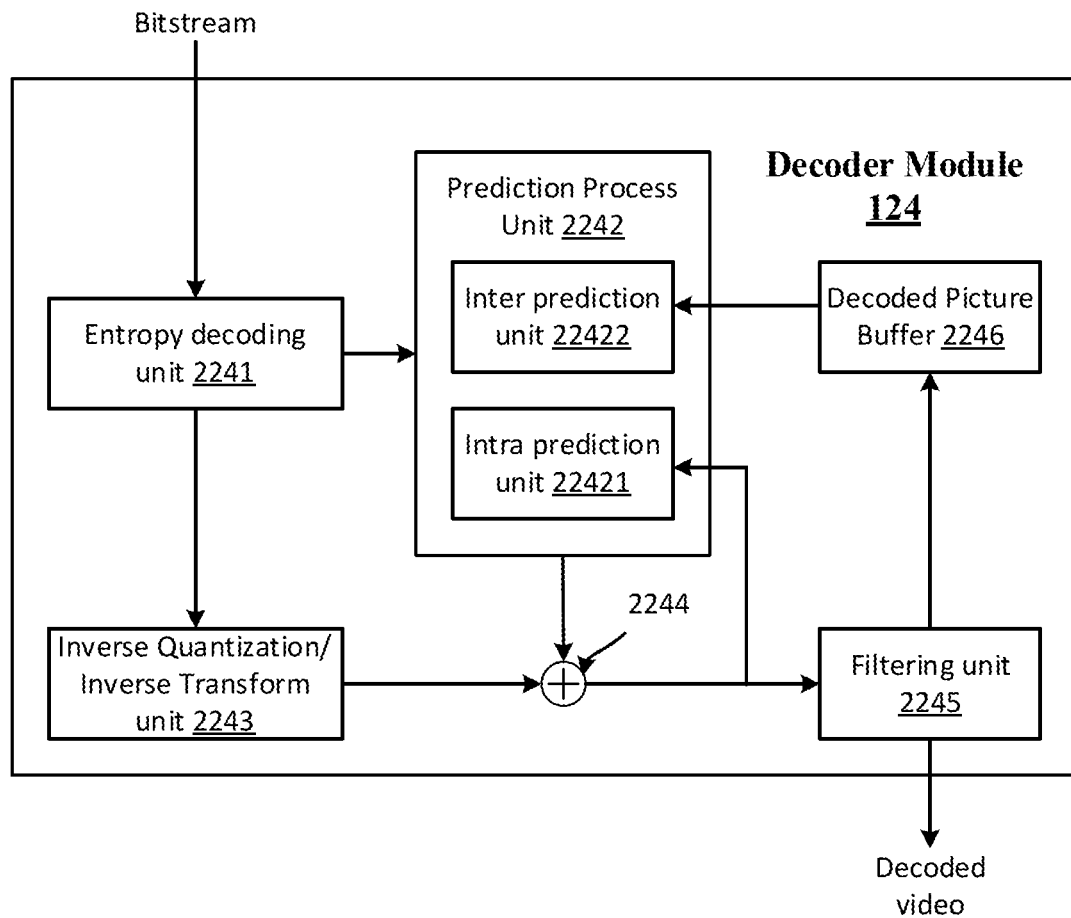
FIG. 2 illustrates a block diagram of an example decoder module of the second electronic device in FIG. 1 according to an example implementation of the present application.

FIG. 2 illustrates a block diagram representing an implementation of the decoder module 124 of the second electronic device 120 in FIG. 1, according to an example implementation of the present application. The decoder module 124 includes an entropy decoder (e.g., an entropy decoding unit 2241), a prediction processor (e.g., a prediction process unit 2242), an inverse quantization/inverse transform processor (e.g., an inverse quantization/inverse transform unit 2243), a summer (e.g., a summer 2244), a filter (e.g., a filtering unit 2245), and a decoded picture buffer (e.g., a decoded picture buffer 2246). The prediction process unit 2242 further includes an intra prediction processor (e.g. an intra prediction unit 22421) and an inter prediction processor (e.g. an inter prediction unit 22422). The decoder module 124 receives a bitstream and decodes the bitstream to output decoded video.

The entropy decoding unit 2241 may receive the bitstream including a plurality of syntax elements from the second interface 126 in FIG. 1 and perform a parsing operation on the bitstream to extract syntax elements from the bitstream. As part of the parsing operation, the entropy decoding unit 2241 may entropy decode the bitstream to generate quantized transform coefficients, quantization parameters, transform data, motion vectors, intra modes, partition information, and other syntax information.

In at least one implementation, the entropy decoding unit 2241 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique to generate the quantized transform coefficients. In at least one implementation, the entropy decoding unit 2241 may provide the quantized transform coefficients, the quantization parameters, and the transform data to the inverse quantization/inverse transform unit 2243 and provide the motion vectors, the intra modes, the partition information, and other syntax information to the prediction process unit 2242.

In at least one implementation, the prediction process unit 2242 may receive syntax elements such as motion vectors, intra modes, partition information, and other syntax information from the entropy decoding unit 2241. The prediction process unit 2242 may receive the syntax elements including the partition information and divide image frames according to the partition information.

In at least one implementation, each of the image frames may be divided into at least one image block according to the partition information. The at least one image block may include a luminance block for reconstructing a plurality of luminance samples and at least one chrominance block for reconstructing a plurality of chrominance samples. The luminance block and the at least one chrominance block may be further divided to generate macroblocks, coding tree units (CTUs), coding blocks (CBs), sub-divisions thereof, and/or another equivalent coding unit.

In at least one implementation, during the decoding process, the prediction process unit 2242 receives predicted data including the intra mode or the motion vector for a current image block of a specific one of the image frames. The current image block may be the luminance block or one of the chrominance blocks in the specific image frame.

In at least one implementation, the intra prediction unit 22421 may perform intra-predictive coding of a current block unit relative to one or more neighboring blocks in the same frame as the current block unit based on syntax elements related to the intra mode in order to generate a predicted block. The intra mode may specify the location of reference samples selected from the neighboring blocks within the current frame. In at least one implementation, the intra prediction unit 22421 may reconstruct a plurality of chroma components of the current block unit based on a plurality of luma components of the current block unit when the chroma components are reconstructed by the prediction process unit 2242.

In at least one implementation, the intra prediction unit 22421 may reconstruct a plurality of chroma components of the current block unit based on the plurality of luma components of the current block unit when the luma components of the current block are reconstructed by the prediction process unit 2242.

In at least one implementation, the inter prediction unit 22422 may perform inter-predictive coding of the current block unit relative to one or more blocks in one or more reference image blocks based on syntax elements related to the motion vector in order to generate the predicted block.

In at least one implementation, the motion vector may indicate a displacement of the current block unit within the current image block relative to a reference block unit within the reference image block. The reference block unit is a block determined to closely match the current block unit.

In at least one implementation, the inter prediction unit 22422 receives the reference image block stored in the decoded picture buffer 2246 and reconstructs the current block unit based on the received reference image blocks.

In at least one implementation, the inverse quantization/inverse transform unit 2243 may apply inverse quantization and inverse transformation to reconstruct the residual block in the pixel domain. The inverse quantization/inverse transform unit 2243 may apply inverse quantization to the residual quantized transform coefficient to generate a residual transform coefficient and then apply inverse transformation to the residual transform coefficient to generate the residual block in the pixel domain.

In at least one implementation, the inverse transformation may be inversely applied by the transformation process such as discrete cosine transform (DCT), discrete sine transform (DST), adaptive multiple transform (AMT), mode-dependent non-separable secondary transform (MDNSST), hyper-cube-givens transform (HyGT), signal dependent transform, Karhunen-Loéve transform (KLT), wavelet transform, integer transform, sub-band transform or a conceptually similar transform.

In at least one implementation, the inverse transformation may convert the residual information from a transform domain, such as a frequency domain, back to the pixel domain. The degree of inverse quantization may be modified by adjusting a quantization parameter. The summer 2244 adds the residual block to the predicted block from the prediction process unit 2242 to produce a reconstructed block.

In at least one implementation, the summer 2244 adds the reconstructed residual block to the predicted block provided from the prediction process unit 2242 to produce a reconstructed block.

In at least one implementation, the filtering unit 2245 may include a deblocking filter, a sample adaptive offset (SAO) filter, a bilateral filter, and/or an adaptive loop filter (ALF) to remove blocking artifacts from the reconstructed block. Additional filters (in loop or post loop) may also be used in addition to the deblocking filter, the SAO filter, the bilateral filter and the ALF. Such filters are not shown for brevity but may filter the output of the summer 2244.

The filtering unit 2245 may output the decoded video to the display module 122 or other video receiving unit after the filtering unit 2245 performs the filtering process for the reconstructed blocks of the specific image frame.

In at least one implementation, the decoded picture buffer 2246 may be a reference picture memory that stores the reference block for use by the prediction process unit 2242 in decoding the bitstream (in inter coding modes). The decoded picture buffer 2246 may be formed by any of a variety of memory devices such as dynamic random-access memory (DRAM), including synchronous DRAM (SDRAM), magneto-resistive RAM (MRAM), resistive RAM (RRAM), or other types of memory devices.

In at least one implementation, the decoded picture buffer 2246 may be on-chip with other components of the decoder module 124 or off-chip relative to those components.

Figure 3:
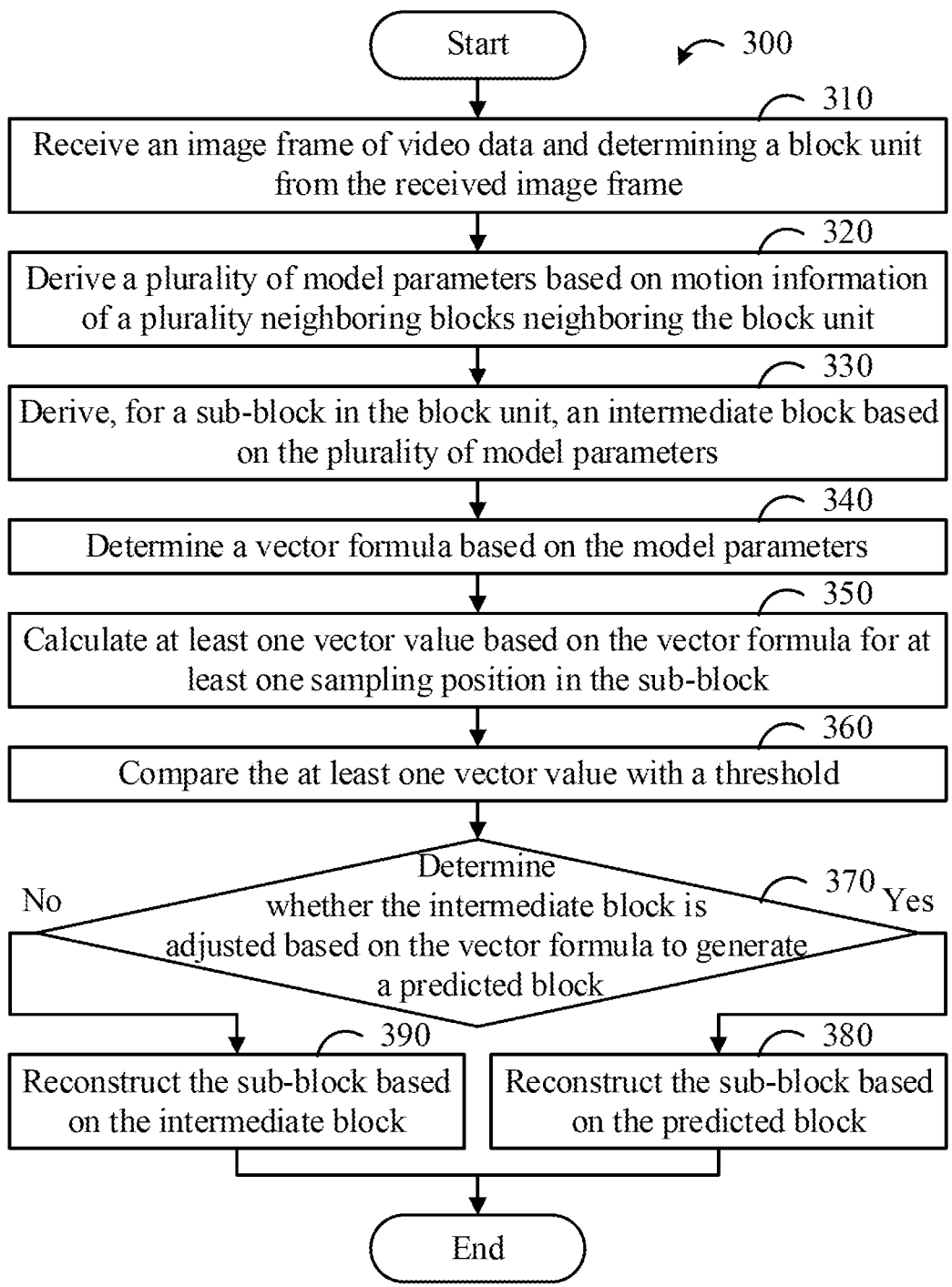
FIG. 3 illustrates a flowchart of an example reconstruction method for reconstructing a block unit according to an example implementation of the present disclosure.

FIG. 3 illustrates a flowchart of an example reconstruction method 300 for reconstructing a block unit according to an example implementation of the present disclosure. The method 300 is an example only as there are a variety of ways to perform the method.

The method 300 may be performed using the configurations illustrated in FIG. 1 and FIG. 2 and various elements of these figures are referenced in explaining the method 300. Each block shown in FIG. 3 may represent one or more processes, methods, or subroutines performed.

Furthermore, the order of blocks is illustrative only and may change. Additional blocks may be added or less blocks may be utilized without departing from the present disclosure.

At block 310, the decoder module 124 receives an image frame of video data and determines a block unit from the image frame according to the received video data. The video data may be a bitstream.

With reference to FIG. 1 and FIG. 2, the second electronic device 120 may receive the bitstream from an encoder, such as the first electronic device 110, or other video providers via the second interface 126. The second interface 126 may provide the bitstream to the decoder module 124.

The decoder module 124 may determine the image frame based on the bitstream and divide the image frame to determine the block unit according to a plurality of partition indications in the bitstream. For example, the decoder module 124 may divide the image frames to generate a plurality of coding tree units and may further divide one of the coding tree units to determine the block unit according to the partition indications (e.g., based on a video coding standard).

In at least one implementation, the entropy decoding unit 2241 may decode the bitstream to determine a plurality of prediction indications for the block unit and the decoder module 124 may further reconstruct the block unit based on the prediction indications. The prediction indications may include a plurality of flags and a plurality of indices.

At block 320, the decoder module 124 derives a plurality of model parameters based on motion information of a plurality of neighboring blocks neighboring the block unit.

In at least one implementation, with reference to FIG. 2, the decoder module 124 may determine a plurality of neighboring blocks neighboring the block unit. In at least one implementation, the decoder module 124 may select the neighboring blocks based on a plurality of predefined positions relative to the block unit. For example, the predefined positions may include a top-left (TL) position, a top-right (TR) position and a bottom-left (BL) position of the block unit. Then, the decoder module 124 may determine whether there is at least one of the neighboring blocks located at each of the predefined positions. In one implementation, the decoder module 124 may determine that there is no neighboring block located at the TR position, when the block unit is located at an upper boundary of the image frame. Thus, the decoder module 124 may ignore a specific one of the predefined positions, when the neighboring block is nonexistent at the specific predefined position.

Figure 4A:
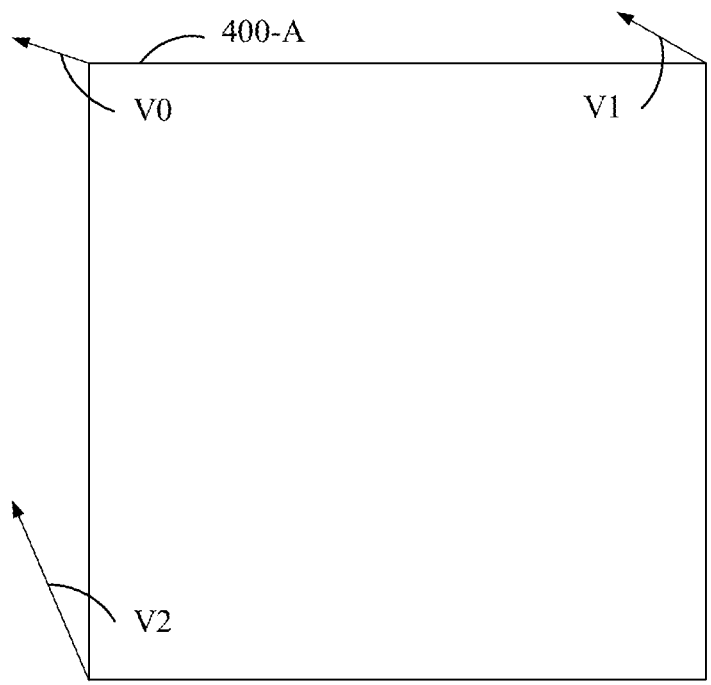
FIGS. 4A and 4B are schematic illustrations of a block unit having a plurality of reference vectors and a plurality of sub-blocks each having a sub-block vector, according to example implementations of the present application.

In at least one implementation, the decoder module 124 may receive the motion information corresponding to the determined neighboring blocks, when the neighboring blocks are reconstructed by the inter prediction mode. In one implementation, the decoder module 124 determines a reconstructed block including a specific one of the neighboring blocks, and determines how to reconstruct the reconstructed block. When the reconstructed block is reconstructed by the inter prediction mode, the decoder module 124 may receive the motion information of the reconstructed block and set the motion information of the reconstructed block as the motion information of the specific neighboring block. In one implementation, the motion information of the specific neighboring block may include more than one motion vector. The specific neighboring block may be reconstructed based on two or three motion vectors when the specific neighboring block is predicted by an affine mode in the first electronic device 110. Then, the decoder module 124 may receive the motion information of the specific neighboring block and select one motion vector from the two or three motion vectors in the motion information of the specific neighboring block as a reference vector of the block unit. FIG. 4A is a schematic illustration of a block unit 400-A having a plurality of reference vectors, according to example implementations of the present application. The decoder module 124 may receive a first reference vector V0 (Vx0, Vy0), a second reference vector V1 (Vx1, Vy1) and a third reference vector V2 (Vx2, Vy2) from the motion information selected for the predefined positions. The number of the reference vectors may be equal to three.

In at least one implementation, the decoder module 124 may derive a vector model including the model parameters based on the motion information of the selected neighboring blocks. The vector model may be an affine motion model. The decoder module 124 may derive the vector model based on the three reference vectors of the block unit when the vector model is a six-parameter affine motion model. Then, the vector model of the block unit may be derived as follows:

$$\begin{cases} Vx(x,y) = \dfrac{Vx1 - Vx0}{w}x + \dfrac{Vx2 - Vx0}{h}y + Vx0 \\ Vy(x,y) = \dfrac{Vy1 - Vy0}{w}x + \dfrac{Vy2 - Vy0}{h}y + Vyo \end{cases}$$

where $V(x, y)=(Vx(x, y), Vy(x, y))$ represents a vector from an initial point $(x, y)$ in the block unit to an affine point $(x', y')$ corresponding to the initial point $(x, y)$, and the parameters of w and h are a width and a height of the block unit. The model parameters may include four model parameters $(Vx1-Vx0)/w$, $(Vx2-Vx0)/h$, $(Vy1-Vy0)/w$ and $(Vy2-Vy0)/h$. In at least one implementation, the decoder module 124 may derive the vector model based on two of the reference vectors of the block unit when the vector model is a four-parameter affine motion model. For example, the decoder module 124 may derive the vector model based on the first reference vector V0 and the second reference vector V1. Thus, the vector model of the block unit may be derived as follows:

$$\begin{cases} Vx(x, y) = \dfrac{Vx1 - Vx0}{w}x + \dfrac{Vy1 - Vy0}{w}y + Vx0 \\ Vy(x, y) = \dfrac{Vy1 - Vy0}{w}x + \dfrac{Vx1 - Vx0}{w}y + Vyo \end{cases}$$

The model parameters may include two model parameters (Vx1−Vx0)/w and (Vy1−Vy0)/w.

At block 330, the decoder module 124 derives, for a sub-block in the block unit, an intermediate block based on the plurality of model parameters.

In at least one implementation, with reference to FIG. 2, the decoder module 124 may divide the block unit to generate a plurality of sub-blocks.

Figure 4B:
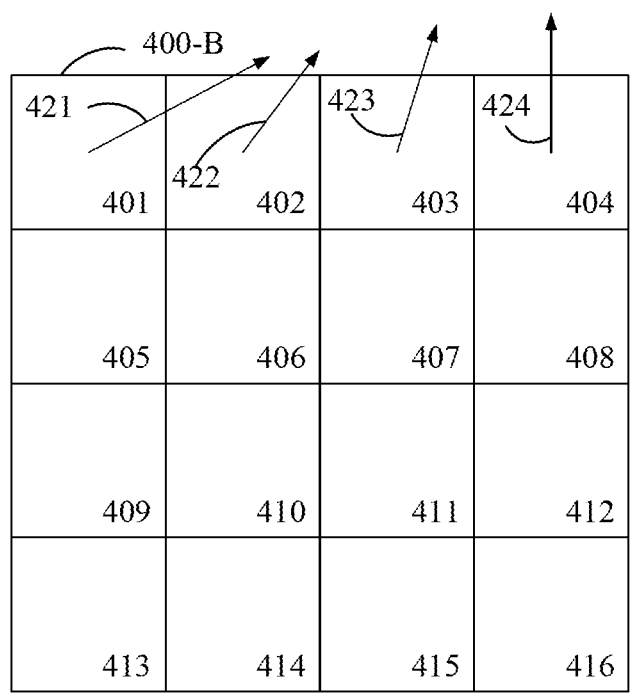

FIG. 4B is a schematic illustrations of a block unit 400-B having the plurality of sub-blocks 401-416 each having a sub-block vector, according to example implementations of the present application. In at least one implementation, a size of the sub-blocks 401-416 may be set to 4×4. In at least one implementation, each of the sub-block vectors may be derived based on the vector model including the model parameters.

In at least one implementation, the decoder module 124 may determine a sub-block location (Lx, Ly) for a specific one of the sub-blocks and substitute the sub-block location (Lx, Ly) into the vector model V (x, y)=(Vx (x, y), Vy (x, y)) having the model parameters to generate a specific one of the sub-block vectors corresponding to the specific sub-block. Thus, the specific sub-block vector V (Lx, Ly) may be determined to be equal to Vsb (Vx (Lx, Ly), Vy (Lx, Ly)). Then, the decoder module 124 may predict the specific sub-block based on the specific sub-block vector Vsb (Lx, Ly) to generate the intermediate block. For example, the decoder module 124 may determine the sub-block location (Lx01, Ly01) for the sub-block 401 and substitute the sub-block location (Lx01, Ly01) into the vector model V (x, y) to generate the sub-block vector 421 Vsb (Lx01, Ly01) corresponding to the sub-block 401. Then, the decoder module 124 may predict the sub-block 401 based on the sub-block vector 421 to generate the intermediate block.

At block 340, the decoder module 124 determines a vector formula based on the model parameters.

In at least one implementation, with reference to FIG. 2, the decoder module 124 may determine the vector formula based on the model parameters of the vector model. In at least one implementation, the vector formula of the block unit may be derived as follows:

$$\begin{cases} \Delta Vx(i, j) = C \times dx(i, j) + D \times dy(i, j) \\ \Delta Vy(i, j) = E \times dx(i, j) + F \times dy(i, j) \end{cases}$$

where dx (i, j) and dy (i, j) represent horizontal and vertical offsets from the sample location (i,j) to the center of the subblock, ΔV(i, j)=(ΔVx (i, j), ΔVy (i, j)) represents a vector difference and the parameters C-F are derived based on the model parameter of the vector model.

In at least one implementation, the parameters C-F may be derived based on the four model parameters (Vx1−Vx0)/w, (Vx2−Vx0)/h, (Vy1−Vy0)/w and (Vy2−Vy0)/h when the vector model is the six-parameter affine motion model. Then, the parameters C-F of the block unit may be derived as follows:

$$\begin{cases} C = \dfrac{Vx1 - Vx0}{w} \\ D = \dfrac{Vx2 - Vx0}{h} \\ E = \dfrac{Vy1 - Vy0}{w} \\ F = \dfrac{Vy2 - Vy0}{h} \end{cases}$$

In at least one implementation, the parameters C-F may be derived based on the two model parameters (Vx1−Vx0)/w and (Vy1−Vy0)/w when the vector model is the four-parameter affine motion model. Then, the parameters C-F of the block unit may be derived as follows:

$$\begin{cases} C = F = \dfrac{Vx1 - Vx0}{w} \\ E = -D = \dfrac{Vy1 - Vy0}{w} \end{cases}$$

At block 350, the decoder module 124 calculates at least one vector value based on the vector formula for at least one sampling position in the sub-block.

Figure 5:
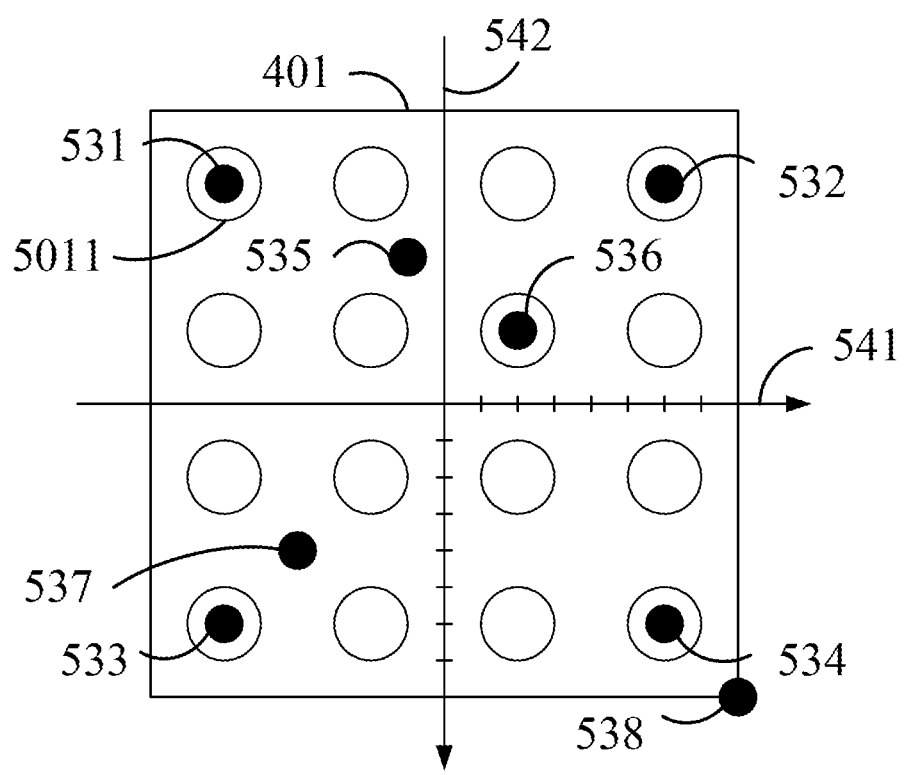
FIG. 5 is a schematic illustration of a plurality of sampling positions in a sub-block having a plurality of block components, according to example implementations of the present application.

In at least one implementation, with reference to FIG. 2, the decoder module 124 may select the at least one sampling position in the sub-block. FIG. 5 is a schematic illustration of a plurality of sampling positions 531-538 in a sub-block 401 having a plurality of block components, according to example implementations of the present application. In at least one implementation, the block component 5011 is one of the block components in the sub-block 401.

In at least one implementation, the decoder module 124 may arbitrarily select one sampling position and determine coordinates of the selected sampling position based on two axes 541, 542. For example, the selected sampling position may be one of the sampling positions 531-538. In one implementation, the sampling position may be identical to one of a plurality of component positions at which one of the block components in the sub-block 401 is located. In another implementation, the sampling position may be different from the component positions.

In at least one implementation, the decoder module 124 may determine one vector value based on the vector formula for the coordinates of the selected sampling position.

In at least one implementation, the decoder module 124 may arbitrarily select one sampling position and determine coordinates of the selected sampling position based on the two axes 541, 542. Then, the decoder module 124 may determine three sampling positions based on the selected sampling position. The selected sampling position and the three determined sampling positions are located at four different quadrants generated by dividing the sub-block 401 by the two axes 541, 542. For example, the selected sampling position may be the sampling position 538 located at (8, 8), when the size of the sub-block 401 is 4×4. Thus, the three determined sampling positions may be located at (−8, −8), (8, −8) and (−8, 8). In other implementations, the decoder module 124 may directly select four sampling positions respectively located at four different quadrants and determine coordinates of the four selected sampling positions based on the two axes 541, 542. In at least one implementation, the decoder module 124 may determine four vector values based on the vector formula for the coordinates of the eight selected sampling positions. For example, the four sampling positions may be four sampling positions 531-534 located at four component corners in the sub-block 401. Thus, the coordinates of the four sampling positions 531-534 may be determined as (−6, −6), (6, −6), (−6, 6) and (6, 6). The decoder module 124 may determine the vector values based on the vector formula for the coordinates of the four sampling positions 531-534. In at least one implementation, the single unit of length for both axes 541, 542 may be changed according to an interpolation, so the coordinates of the sampling positions may also be changed.

In at least one implementation, the decoder module 124 may arbitrarily select N sampling positions and determine coordinates of the selected N sampling positions based on two axes 541, 542. The decoder module 124 may determine the vector values based on the vector formula for the coordinates of the selected N sampling positions. In at least one implementation, the number N may be a positive integer.

In at least one implementation, the decoder module 124 may generate two vector values for each of the at least one sampling position since the vector formula includes two vector equation $\Delta Vx(i, j)$ and $\Delta Vy(i, j)$. In at least one implementation, the decoder module 124 may generate one vector value for each of the at least one sampling position when the decoder module 124 selects one of the vector equations $\Delta Vx(i, j)$ and $\Delta Vy(i, j)$ to calculate the vector value. The at least one vector value may be equal to $C \times i + D \times j$ when the at least one vector value is calculated by the vector equation $\Delta Vx(i, j)$. For example, the vector value may be equal to $C \times P + D \times Q$ when the sampling location is determined as (P, Q).

In at least one implementation, the at least one vector value may be determined based on absolute operation. The at least one vector value may be equal to a sum of a first absolute value of $C \times i$ and a second absolute value of $D \times j$ when the at least one vector value is determined based on the vector equation $\Delta Vx(i, j)$. For example, the vector value may be equal to the sum of the first absolute value of $C \times P$ and a second absolute value of $D \times Q$ when the sampling location is determined as (P, Q).

At block 360, the decoder module 124 compares the at least one vector value with a threshold.

In at least one implementation, with reference to FIG. 2, the decoder module 124 may determine the threshold for comparing the at least one vector value. The threshold may be determined based on a rounding parameter.

In at least one implementation, the decoder module 124 may derive a component vector for each of a plurality of block components in the sub-block based on the vector formula when the intermediate block including a plurality of intermediate components is adjusted based on the vector formula. Each of the component vectors may be rounded down based on the rounding parameter.

In at least one implementation, a specific one of the component vectors corresponding to a specific one of the block components may be rounded down to generate the specific rounded component vector. In one implementation, a specific one of the intermediate components corresponding to the specific block component may be changed when the specific rounded component vector is different from a zero vector. In another implementation, the specific intermediate component corresponding to the specific block component may remain unchanged when the specific rounded component vector is a zero vector. In at least one implementation, each of the component vectors may be separated into two different directional vectors. Thus, the two directional vectors may be respectively rounded down based on the rounding parameter.

In at least one implementation, the component vectors may be rounded by right shifting by S bits. Thus, a specific one of the two directional vectors in the specific component vector may be rounded down to be equal to zero when the specific directional vector is greater than or equal to $-(1 \ll (S-1))$ and less than or equal to $1 \ll (S-1)$. The component vectors may be represented in the two's complement representation. Thus, the specific directional vector in the specific component vector may be rounded down to be equal to zero when the specific directional vector is greater than or equal to $-2^{(S-1)}$ and less than or equal to $2^{(S-1)}$. For example, a component vector $\Delta V(P, Q)$ of a block component located at (P,Q) is determined as $(\Delta Vx(P, Q), \Delta Vy(P, Q))=(E, F)$. Thus, the rounded component vector may be determined as (Round(E), Round(F)). The rounded directional vector Round (E) may be equal to zero when the directional vector E is greater than or equal to $-2^{(S-1)}$ and less than or equal to $2^{(S-1)}$. The threshold may be equal to $2^{(S-1)}$ when the rounding parameter is equal to S.

In at least one implementation, in order to further decrease the possibility of adjusting the intermediate block, the threshold may be further multiplied by a positive number M. For example, the threshold may be equal to $3 \times 2^{(S-1)}$ when the number M is equal to 3.

In at least one implementation, the component vector may be rounded as follows:

$$\text{offset}=(\text{rightShift}==0)?0:(1\ll(\text{rightShift}-1))$$

$$\Delta Vx=((\Delta Vx+\text{offset}-(\Delta Vx>=0))\gg\text{rightShift})\ll\text{leftshift}$$

$$\Delta Vy=((\Delta Vy+\text{offset}-(\Delta Vy>=0))\gg\text{rightShift})\ll\text{leftshift}$$

where rightShift may be a predefined right shift parameter for rounding and leftShift may be a predefined left shift parameter for resolution increase. In one implementation, the predefined right shift parameter may be equal to eight and the predefined left shift parameter may be equal to zero.

In at least one implementation, the component vectors may be rounded by a divisor D. Thus, the specific directional vector may be rounded down to be equal to zero when the specific directional vector is greater than or equal to $-D/2$ and less than or equal to $D/2$. For example, the rounded component vector may be determined as (Round(E), Round(F)) when the component vector $\Delta V(P, Q)$ of the block component located at (P,Q) is determined as (E, F). The rounded directional vector Round (E) may be equal to zero when the directional vector E is greater than or equal to $-D/2$ and less than or equal to $D/2$. The threshold may be equal to $D/2$ when the rounding parameter is equal to the divisor D.

In at least one implementation, in order to further decrease the possibility of adjusting the intermediate block, the threshold may be further multiplied by the positive number M. For example, the threshold may be equal to $3D/2$ when the number M is equal to 3.

In at least one implementation, the at least one vector value may be derived and compared with the threshold as follows:

The variables maxDiffMvX and maxDiffMvY are derived as follows:
  The variable rightShift is set equal to 8
  The variable profThres is set to equal to 1<<(rightShift−1)
  The variable maxDiffMvX and maxDiffMvY are derrived as follows:

maxDiff*MvX*=Abs(6*dHorX*)+Abs(6*dHorY*)

maxDiff*MvY*=Abs(6*dVerX*)+Abs(6*dVerY*)

The variable cbProfFlagLX is derived as follows:
  If one or more of the following conditions are true, cbProfFlagLX is set equal to FALSE.
    ph_prof_disabled_flag is equal to 1.
    fallbackModeTriggered is equal to 1.
    maxDiffMvY and maxDiffMvY are both less than or equal to profThres.
where cbProfFlagLX may indicates whether to enable or disable the adjustment.

At block 370, the decoder module 124 determines whether the intermediate block is adjusted based on the vector formula to generate a predicted block. The method 300 may proceed to block 380 when the decoder module 124 determines to adjust the intermediate block for generating the predicted block. The method may proceed to block 390 when the decoder module 124 determines not to adjust the intermediate block.

In at least one implementation, with reference to FIG. 2, the decoder module 124 may determine whether the intermediate block is adjusted based on the comparison between the at least one vector value and the threshold.

In at least one implementation, the decoder module 124 may determine that the predicted block is generated for the intermediate block when one of the at least one vector value is greater than the threshold. In addition, the decoder module 124 may determine that the predicted block is not generated when each of the at least one vector value is less than or equal to the threshold.

In one implementation, with reference to FIG. 5, the at least one vector value may be generated based on the vector formula from the four sampling positions 531-534 located at the four component corners. Since an intersection point of the axes 541, 542 is located at the center of the sub-block 542, the maximum of the vector values generated based on the four component corners is equal to the maximum of the vector values generated from the sampling positions of all the block components. In addition, the minimum of the vector values generated based on the four component corners is the minimum of the vector values generated from the sampling positions of all the block components. Some of the vector values generated by the sampling positions arbitrarily selected from the sub-block may not be rounded to be equal to zero when one of the absolute values of the at least one vector value generated based on the four component corners is greater than the threshold. Thus, the intermediate block may be adjusted based on the vector formula. In addition, all of the vector values may be rounded to be equal to zero when the absolute values of the at least one vector value generated based on the four component corners are less than or equal to the threshold. Thus, the predicted block may be identical to the intermediate block due to the zero-vector difference when the intermediate block is adjusted based on the vector formula.

In at least one implementation, the vector values generated based on the four component corners may be equal to each other when the at least one vector value is calculated based on absolute operation. Thus, the decoder module 124 may select only one sampling position located at one of the component corners to calculate the vector value for comparing with the threshold.

In at least one implementation, the maximum of the vector values generated based on all of the block components may be equal to a specific vector value generated based on one of the four component corners. Thus, the maximum of the vector values of the at least one sampling position selected within the sub-block may be less than the maximum of the vector values generated based on all of the block components when the at least one sampling positions selected within the block unit is different from the four component corners. In at least one implementation, with reference to FIG. 1, the at least one sampling positions different the four component corners may be predefined in the encoder mode 114 and the decoder mode 124. In the implementation, the maximum of the vector values of the four component corners which is greater than the vector values of generated based on the at least one predefined sampling position may be greater than the threshold, when the vector values generated based on the at least one predefined sampling position different from the four component corners is greater than the threshold. In addition, the maximum of the vector values of the four component corners may be greater than, equal to or less than the threshold, when the vector values generated based on the at least one predefined sampling position different from the four component corners is less than the threshold. Thus, both of the encoder mode 114 and the decoder module 124 may not be able to determine whether the vector values of the component corners are greater than the threshold when the vector values generated based on the at least one predefined sampling position is less than the threshold. Some of the adjustment to the intermediate components in the intermediate block may be incorrectly bypassed when the adjustment is disabled according to the comparison between the threshold and the vector values of the at least one predefined sampling position. In the implementation, although the coding efficiency may be decreased, the possibility of the adjustment is decreased so the coding speed may be increased.

In at least one implementation, the decoder module 124 may determine to adjust the intermediate block when each of the at least one vector value is greater than the threshold. In addition, the decoder module 124 may determine that the predicted block is not generated when one of the at least one vector value is less than or equal to the threshold. In one implementation, the predicted block may not be generated when some of the at least one vector value is less than or equal to the threshold and the other is greater than the threshold. Some of the adjustment to the intermediate components in the intermediate block may be bypassed so the coding efficiency may be decreased. However, the possibility of the adjustment is decreased so the coding speed may be increased.

At block 380, the decoder module 124 reconstructs the sub-block based on the predicted block.

In at least one implementation, with reference to FIG. 2, the decoder module 124 may reconstruct the sub-block 401 based on the predicted block since the intermediate block is adjusted. The sub-block 401 may be reconstructed by adding the predicted block into a residual block of the sub-block determined from the bitstream.

Figure 6A:
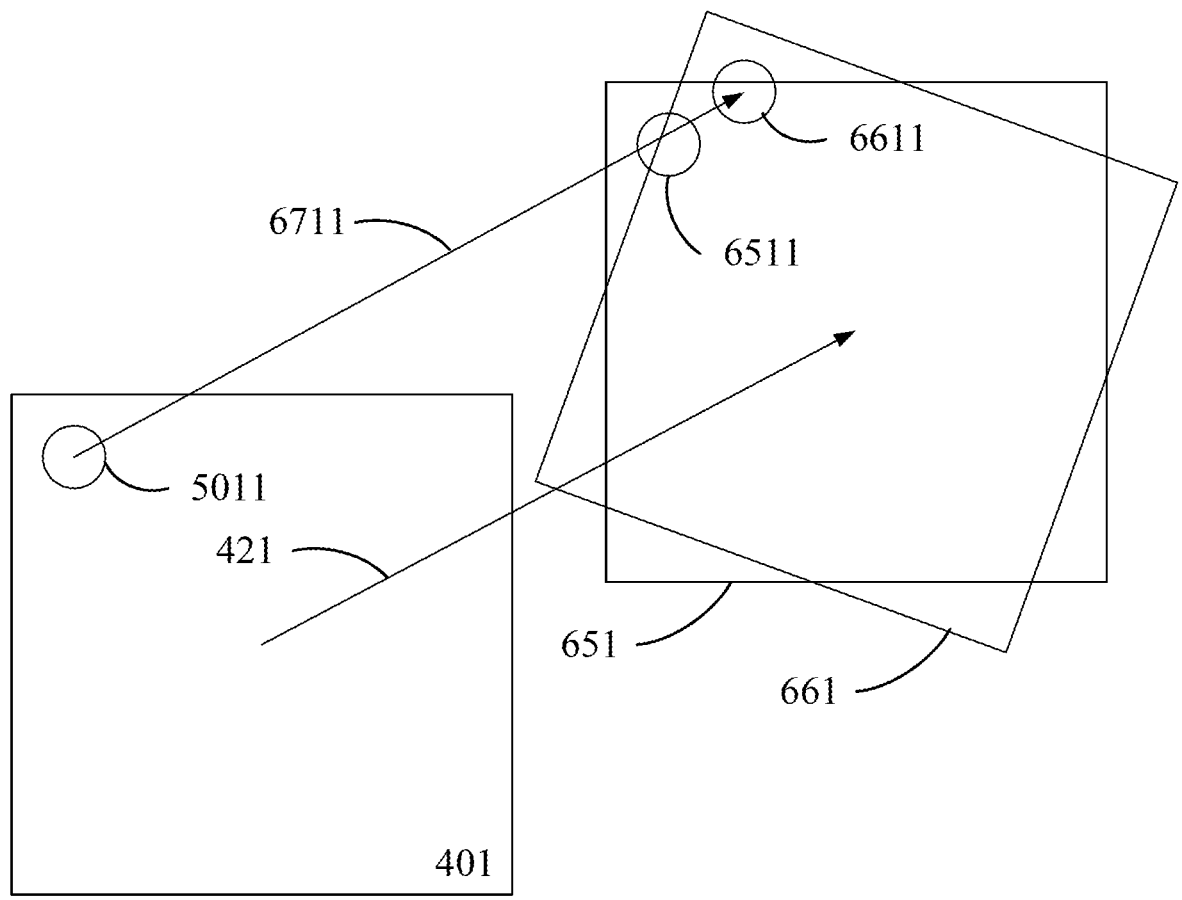
FIGS. 6A and 6B illustrate a relationship between a sub-block, an intermediate block and a predicted block, according to example implementations of the present application.
Figure 6B:
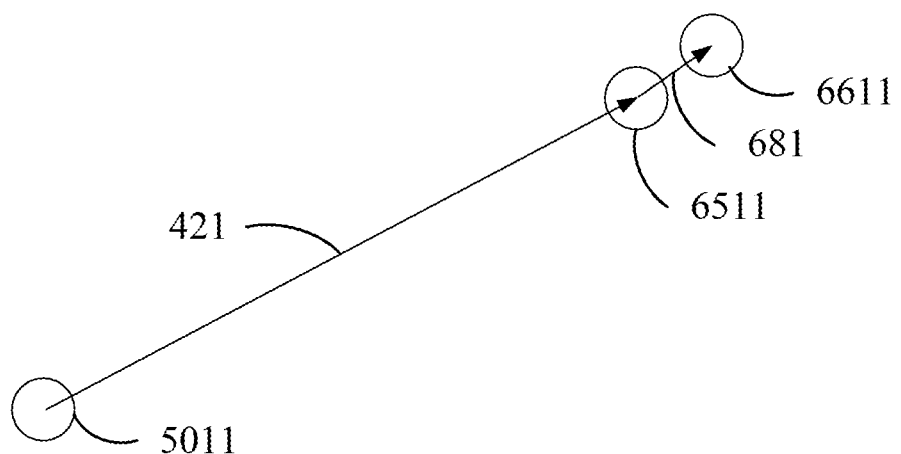

FIGS. 6A and 6B illustrate a relationship between the sub-block 401, an intermediate block 651 and a predicted block 661, according to example implementations of the present application. In at least one implementation, an intermediate component 6511 of the intermediate block 651 may be determined based on the sub-block vector 421 for the block component 5011 of the sub-block 401. The vector difference 681 of the intermediate block 651 may be determined based on the vector formula, so a predicted component 6611 of the predicted block 661 is determined based on a predicted vector 6711 generated by adding the vector difference 681 into the sub-block vector 421.

In at least one implementation, the summer 2244 in the second electronic device 120 may add the predicted block 661 to the residual block to reconstruct the block unit. The decoder module 124 may reconstruct all other block units in the image frame for reconstructing the image frame and the video.

At block 390, the decoder module 124 reconstructs the sub-block based on the intermediate block.

In at least one implementation, with reference to FIGS. 2 and 6A, the decoder module 124 may reconstruct the sub-block 401 directly based on the intermediate block 651 since the adjustment to the intermediate block 651 is bypassed. The sub-block may be reconstructed by adding the intermediate block 651 into a residual block of the sub-block determined from the bitstream. In at least one implementation, the intermediate block 651 may be determined based on the sub-block vector 421 for the sub-block 401.

In at least one implementation, the summer 2244 in the second electronic device 120 may add the intermediate block 651 to the residual block to reconstruct the block unit. The decoder module 124 may reconstruct all other block units in the image frame for reconstructing the image frame and the video.

Figure 7:
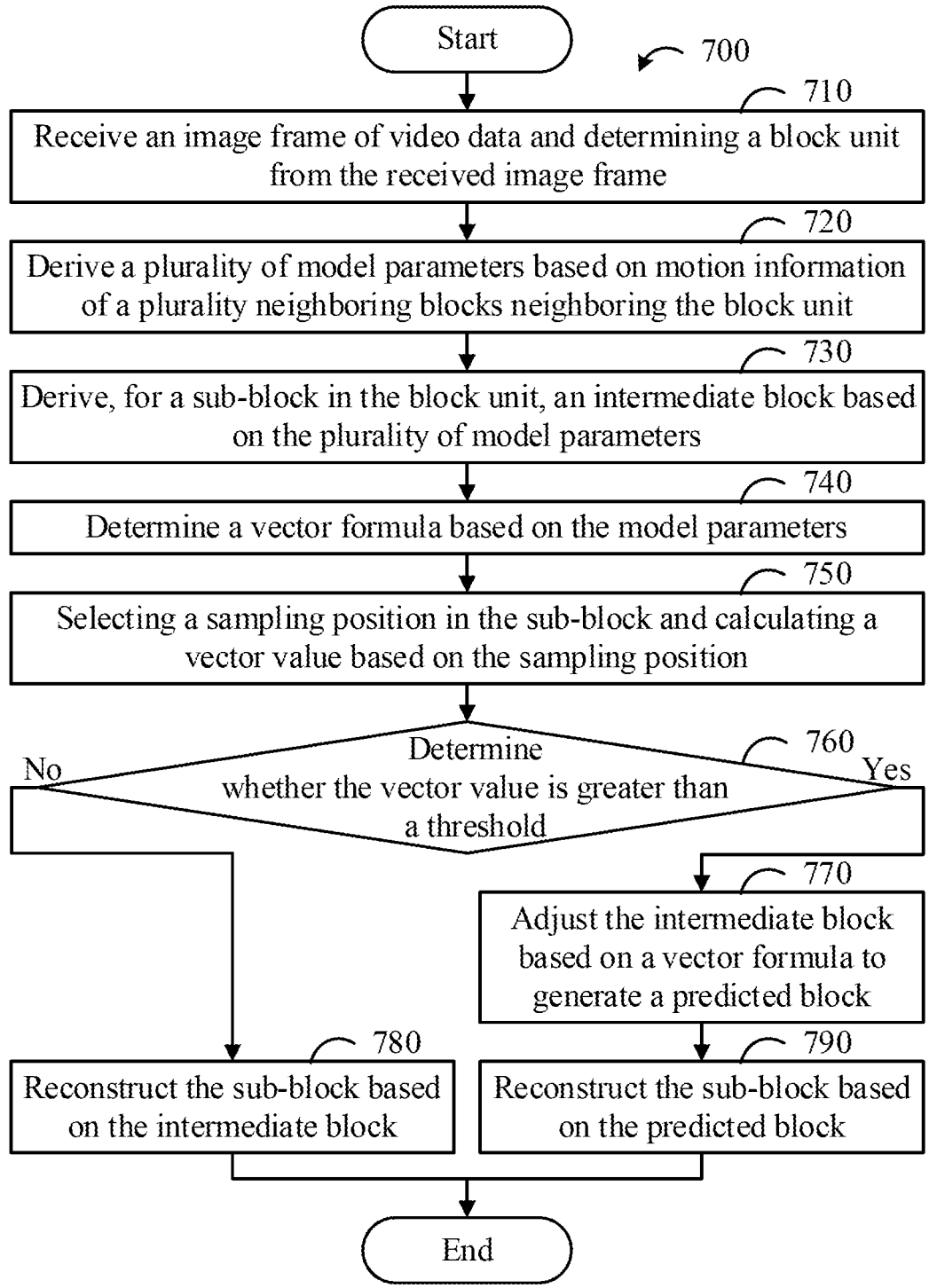
FIG. 7 illustrates a flowchart of another example reconstruction method for reconstructing a block unit according to an example implementation of the present disclosure.

FIG. 7 illustrates a flowchart of an example reconstruction method 700 for reconstructing a block unit according to an example implementation of the present disclosure. The method 700 is an example only as there are a variety of ways to perform the method.

The method 700 may be performed using the configurations illustrated in FIG. 1 and FIG. 2 and various elements of these figures are referenced in explaining the method 700. Each block shown in FIG. 7 may represent one or more processes, methods, or subroutines performed.

Furthermore, the order of blocks is illustrative only and may change. Additional blocks may be added or less blocks may be utilized without departing from the present disclosure.

At block 710, the decoder module 124 receives an image frame of video data and determines a block unit from the image frame according to the received video data. The video data may be a bitstream.

With reference to FIG. 1 and FIG. 2, the second electronic device 120 may receive the bitstream from an encoder, such as the first electronic device 110, via the second interface 126. The second interface 126 may provide the bitstream to the decoder module 124. The decoder module 124 may determine the image frame based on the bitstream and divide the image frame to determine the block unit according to a plurality of partition indications in the bitstream.

At block 720, the decoder module 124 derives a plurality of model parameters based on motion information of a plurality neighboring blocks neighboring the block unit.

In at least one implementation, with reference to FIG. 2, the decoder module 124 may determine a plurality of neighboring blocks neighboring the block unit. The decoder module 124 may select the neighboring blocks based on a plurality of predefined positions relative to the block unit to receive the motion information corresponding to the selected neighboring blocks.

In at least one implementation, with reference to FIG. 4, the decoder module 124 may receive a first reference vector V0 (Vx0, Vy0), a second reference vector V1 (Vx1, Vy1) and a third reference vector V2 (Vx2, Vy2) from the motion information of selected for the predefined positions. The number of the reference vectors may be equal to three.

In at least one implementation, the decoder module 124 may derive a vector model including the model parameters based on the motion information of the neighboring blocks. The vector model may be an affine motion model. In one implementation, the decoder module 124 may derive the vector model based on the three reference vectors when the vector model is a six-parameter affine motion model. The model parameters may include four model parameters (Vx1−Vx0)/w, (Vx2−Vx0)/h, (Vy1−Vy0)/w and (Vy2−Vy0)/h when the parameters of w and h are identical to a width and a height of the block unit. In other embodiment, the decoder module 124 may derive the vector model based on two of the reference vectors when the vector model is a four-parameter affine motion model. The model parameters may include two model parameters (Vx1−Vx0)/w and (Vy1−Vy0)/w.

At block 730, the decoder module 124 derives, for a sub-block in the block unit, an intermediate block based on the plurality of model parameters.

In at least one implementation, with reference to FIGS. 2 and 4B, the decoder module 124 may divide the block unit 400-B to generate a plurality of sub-blocks 401-416. A size of the sub-blocks 401-416 may be set to 4×4. Each of the sub-blocks 401-416 may have a sub-block vector derived based on the vector model including the model parameters.

In at least one implementation, the decoder module 124 may determine a sub-block location (Lx, Ly) for a specific one of the sub-blocks and substitute the sub-block location (Lx, Ly) into the vector model V (x, y)=(Vx (x, y), Vy (x, y)) to generate a specific one of the sub-block vectors Vsb (Vx (x, y), Vy (x, y)) corresponding to the specific sub-block. Thus, the decoder module 124 may determine that the specific sub-block vector Vsb (Lx, Ly) may be determined to be equal to Vsb (Vx (Lx, Ly), Vy (Lx, Ly)). Then, the decoder module 124 may predict the specific sub-block based on the specific sub-block vector Vsb (Lx, Ly) to generate the intermediate block.

At block 740, the decoder module 124 determines a vector formula based on the model parameters.

In at least one implementation, with reference to FIG. 2, the decoder module 124 determines the vector formula based on the model parameters of the vector model. In at least one implementation, the vector formula of the block unit may be derived as follows:

$$\begin{cases} \Delta Vx(i,\ j) = C \times dx(i,\ j) + D \times dy(i,\ j) \\ \Delta Vy(i,\ j) = E \times dx(i,\ j) + F \times dy(i,\ j) \end{cases}$$

where dx (i, j) and dy (i, j) represents horizontal and vertical offsets from the sample location (i,j) to the center of the subblock, $\Delta V(i, j)=(\Delta Vx (i, j), \Delta Vy (i, j))$ represents a vector difference and the parameters C-F are derived based on the model parameter of the vector model.

In at least one implementation, the parameters C-F may be equal to the four model parameters (Vx1-Vx0)/w, (Vx2−Vx0)/h, (Vy1−Vy0)/w and (Vy2−Vy0)/h when the vector model is the six-parameter affine motion model. In at least one implementation, the parameters C and F may be equal to the model parameters (Vx1-Vx0)/w and the parameters E and (−D) may be equal to the model parameters (Vy1−Vy0)/w when the vector model is the four-parameter affine motion model.

In at least one implementation, the parameters C-F may be equal to the four model parameters (Vx1−Vx0)/w, (Vx2−Vx0)/h, (Vy1−Vy0)/w and (Vy2−Vy0)/h when the vector model is the six-parameter affine motion model. In at least one implementation, the parameters C and F may be equal to the model parameters (Vx1−Vx0)/w and the parameters E and (−D) may be equal to the model parameters (Vy1−Vy0)/w when the vector model is the four-parameter affine motion model.

At block 750, the decoder module 124 selects a sampling position in the sub-block and calculates a vector value based on the sampling position.

In at least one implementation, with reference to FIGS. 2 and 5, the decoder module 124 may select the sampling position in the sub-block 401. In at least one implementation, the block component 5011 may be one of the block components in the sub-block 401. In at least one implementation, the decoder module 124 may arbitrarily select one sampling position and determine coordinates of the selected sampling position based on two axes 541, 542. For example, the selected sampling position may be the sampling position 535 located at (−1, −3). The decoder module 124 may determine one vector value based on the vector formula for the coordinates of the selected sampling position.

In at least one implementation, the decoder module 124 may select the sampling position located at one of four component corners in the sub-block 401 and determine coordinates of the selected sampling position based on the two axes 541, 542. For example, the selected sampling position may be the sampling position 531 at which the block component 5011 is located. Thus, the coordinates of the selected sampling position may be determined as (−6, 6).

In at least one implementation, the single unit of length for both axes 541, 542 may be changed according to an interpolation, the coordinates of the sampling positions may also be changed.

In at least one implementation, the decoder module 124 may generate two vector values for the selected sampling position since the vector formula includes two vector equation $\Delta Vx(i, j)$ and $\Delta Vy(i, j)$. In at least one implementation, the decoder module 124 may generate one vector value for the selected sampling position when the decoder module 124 selects one of the two vector equations $\Delta Vx(i, j)$ and $\Delta Vy(i, j)$ to calculate the vector value. The vector value may be equal to $C \times i + D \times j$ when the vector value is calculated by one of the two vector equations, such as $\Delta Vx(i, j)$. The two vector values may include $C \times i + D \times j$ and $E \times i + F \times j$ when the decoder module 124 calculates based on the two vector equations $\Delta Vx(i, j)$ and $\Delta Vy(i, j)$.

In at least one implementation, the vector value may be determined based on absolute operation. The vector value may be equal to a sum of a first absolute value of $C \times i$ and a second absolute value of $D \times j$ when the vector value is determined based on the vector equation $\Delta Vx(i, j)$.

At block 760, the decoder module 124 determines whether the vector value is greater than a threshold. In at least one implementation, the method 700 may proceed to block 770 when the vector value is greater than the threshold. The method may proceed to block 780 when the vector value is less than or equal to the threshold.

In at least one implementation, with reference to FIG. 2, the decoder module 124 may determine the threshold for comparing the at least one vector value. In at least one implementation, the threshold may be determined based on a rounding parameter.

In at least one implementation, the decoder module 124 may derive a component vector for each of a plurality of block components in the sub-block when the intermediate block including a plurality of intermediate components is adjusted based on the vector formula. Each of the component vectors may be rounded down based on the rounding parameter. A specific one of the intermediate components having a specific one of the component vectors may remain unchanged when the specific rounded component vector is a zero vector.

In at least one implementation, each of the component vectors may be separated into two different directional vectors. Thus, the two directional vectors may be respectively rounded based on the rounding parameter.

In at least one implementation, the component vectors may be rounded by right shifting by S bits. Thus, a specific one of the two directional vectors in the specific component vector may be rounded down to be equal to zero when the specific directional vector is greater than or equal to $-(1 \ll (S-1))$ and less than or equal to $1 \ll (S-1)$. The operator "$\ll$" in a function "$u \ll v$" is an arithmetic right shift of two's complement integer representation of u by v binary digits. The component vectors may be represented in the two's complement representation. Thus, the specific directional vector in the specific component vector may be rounded down to be equal to zero when the specific directional vector is greater than or equal to $-2(S-1)$ and less than or equal to $2(S-1)$. The threshold may be equal to $2(S-1)$ when the rounding parameter is equal to S. In at least one implementation, in order to further decrease the possibility of adjusting the intermediate block, the threshold may be further multiplied by a positive number M.

In at least one implementation, the component vectors may be rounded by a divisor D. Thus, the specific directional vector may be rounded down to be equal to zero when the specific directional vector is greater than or equal to $-D/2$ and less than or equal to $D/2$. The specific directional vector in the specific component vector may be rounded down to be equal to zero when the directional vector E is greater than or equal to $-D/2$ and less than or equal to $D/2$. The threshold may be equal to $D/2$ when the rounding parameter is equal to the divisor D. In at least one implementation, in order to further decrease the possibility of adjusting the intermediate block, the threshold may be further multiplied by the positive number M.

At block 770, the decoder module 124 adjusts the intermediate block based on the vector formula to generate a predicted block.

In at least one implementation, with reference to FIG. 2, the decoder module 124 may determine that the predicted block is generated for the intermediate block when the vector value is greater than the threshold. The decoder module 124 may determine that the predicted block is not generated when the vector value is less than or equal to the threshold.

In one implementation, with reference to FIG. 5, the vector value may be generated based on the vector formula from the sampling position 531 at which the block component 5011 is located. Since an intersection point of the axes 541, 542 is located at the center of the sub-block 542, the vector value generated based on the absolute operation for the sampling position 531 is the maximum of the vector values generated based on the absolute operation for the sampling positions located at all of the block components.

Some of the vector values for the block components may not be rounded to be equal to zero when the vector value based on the absolute operation for the sampling position 531 is greater than the threshold. Thus, the intermediate block may be adjusted based on the vector formula. In addition, all of the vector values may be rounded to be equal to zero when the absolute values of the vector value generated for the sampling position are less than or equal to the threshold. Thus, the predicted block may be identical to the intermediate block due to the zero vector difference when the intermediate block is adjusted based on the vector formula.

In at least one implementation, the vector value generated for the selected sampling position may be less than the maximum of the vector values generated for the sampling positions located at all of the block components when the distance between the selected sampling position and the intersection point of the axes 541, 542 is less than the distance between the component corners and the intersection point. Thus, there may be a block component having a vector value greater than the threshold when the vector value of the selected sampling position is less than or equal to the threshold. Some of the adjustment to the intermediate components in the intermediate block may be bypassed so the coding efficiency may be decreased. However, the possibility of the adjustment is decreased so the coding speed may be increased.

In at least one implementation, with reference to FIGS. 6A and 6B, the decoder module 124 may determine each of the intermediate components of the intermediate block 651 based on the sub-block vector 421 for the block components of the sub-block 401. Then, the decoder module 124 may determine a plurality of vector difference each corresponding to one of the intermediate components based on the vector formula, and determine a plurality of predicted components for the intermediate components based on the vector differences. For example, the decoder module 124 may determine the intermediate component 6511 for the block component 5011 based on the sub-block vector 421, and derive the vector difference 681 for the intermediate component 6511 for determining the predicted component 6611. Thus, the predicted block 661 may be determined based on the sub-block vector 421 and the vector differences.

At block 780, the decoder module 124 reconstructs the sub-block based on the intermediate block.

In at least one implementation, with reference to FIG. 2, the decoder module 124 may reconstruct the sub-block directly based on the intermediate block since the vector value is less than or equal to the threshold. The sub-block may be reconstructed by adding the intermediate block into a residual block of the sub-block determined from the bitstream. In at least one implementation, with reference to FIG. 6A, the intermediate block 651 may be determined based on the sub-block vector 421 for the sub-block 401.

In at least one implementation, the summer 2244 in the second electronic device 120 may add the intermediate block 651 to the residual block for reconstructing the block unit. The decoder module 124 may reconstruct all other block units in the image frame for reconstructing the image frame and the video.

At block 790, the decoder module 124 reconstructs the sub-block based on the predicted block.

In at least one implementation, with reference to FIGS. 2, 6A and 6B, the decoder module 124 may reconstruct the sub-block 401 based on the predicted block 661 since the intermediate block 651 is adjusted. The sub-block 401 may be reconstructed by adding the predicted block 661 into the residual block of the sub-block determined from the bitstream. In at least one implementation, the intermediate component 6511 of the intermediate block 651 may be determined based on the sub-block vector 421 for the block component 5011 of the sub-block 401. The vector difference 681 of the intermediate block 651 may be determined based on the vector formula, so the predicted component 6611 of the predicted block 661 is determined based on a predicted vector 6711 generated by adding the vector difference 681 into the sub-block vector 421.

In at least one implementation, the summer 2244 in the second electronic device 120 may add the predicted block to the residual block to reconstruct the block unit. The decoder module 124 may reconstruct all other block units in the image frame for reconstructing the image frame and the video.

Figure 8:
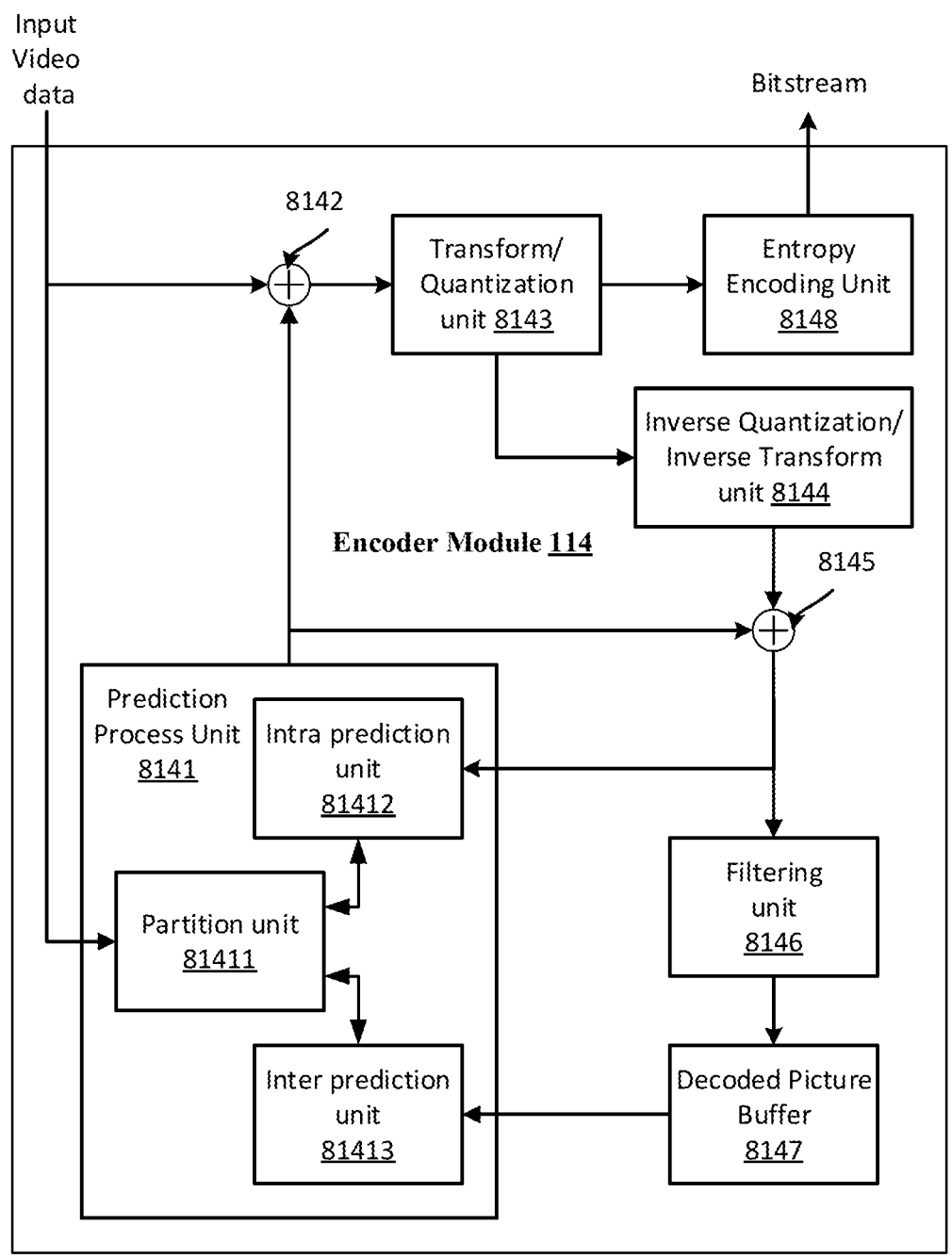
FIG. 8 illustrates a block diagram of an example encoder module of the first electronic device FIG. 1 according to an example implementation of the present application.

FIG. 8 illustrates an encoder module 114 that is an implementation of the encoder module 114 in FIG. 1. The encoder module 114 may include a prediction processor (e.g., a prediction process unit 8141), at least a first summer (e.g., a first summer 8142) and a second summer (e.g., a second summer 8145), a transform/quantization processor (e.g., a transform/quantization unit 8143), an inverse quantization/inverse transform processor (e.g., an inverse quantization/inverse transform unit 8144), a filter (e.g., a filtering unit 8146), a decoded picture buffer (e.g., a decoded picture buffer 8147), and an entropy encoder (e.g., an entropy encoding unit 8148). The prediction process unit 8141 of the encoder module 114 may further include a partition processor (e.g., a partition unit 81411), an intra prediction processor (e.g., an intra prediction unit 81412), and an inter prediction processor (e.g., an inter prediction unit 81413). The encoder module 114 may receive the source video and encode the source video to output a bitstream.

The encoder module 114 may receive a source video including a plurality of image frames and then divide the image frames according to a coding structure. Each of the image frames may be divided into at least one image block.

The at least one image block may include a luminance block having a plurality of luminance samples and at least one chrominance block having a plurality of chrominance samples. The luminance block and the at least one chrominance block may be further divided to generate macroblocks, coding tree units (CTUs), coding blocks (CBs), sub-divisions thereof, and/or another equivalent coding unit.

In at least one implementation, the encoder module 114 may perform additional sub-divisions of the source video. It should be noted that these implementations are generally applicable to video coding regardless of how the source video is partitioned prior to and/or during the encoding.

In at least one implementation, during the encoding process, the prediction process unit 8141 may receive a current image block of a specific one of the image frames during the encoding process. The current image block may be the luminance block or one of the chrominance blocks in the specific image frame.

The partition unit 81411 may divide the current image block into multiple block units. The intra prediction unit 81412 may perform intra-predictive coding of a current block unit relative to one or more neighboring blocks in the same frame as the current block unit in order to provide spatial prediction. The inter prediction unit 81413 may perform inter-predictive coding of the current block unit relative to one or more blocks in one or more reference image blocks to provide temporal prediction.

In at least one implementation, the prediction process unit 8141 may select one of the coding results generated by the intra prediction unit 81412 and the inter prediction unit

81413 based on a mode selection method, such as a cost function. The mode selection method may be a rate-distortion optimization (RDO) process.

The prediction process unit 8141 may determine the selected coding result and provide a predicted block corresponding to the selected coding result to the first summer 8142 for generating a residual block and to the second summer 8145 for reconstructing the encoded block unit. The prediction process unit 8141 may further provide syntax elements such as motion vectors, intra mode indicators, partition information, and other syntax information to the entropy encoding unit 8148.

In at least one implementation, the intra prediction unit 81412 may intra predict the current block unit. The intra prediction unit 81412 may determine an intra prediction mode directed toward a reconstructed sample neighboring the current block unit in order to encode the current block unit.

In at least one implementation, the intra prediction unit 81412 may encode the current block unit using various intra prediction modes and the intra prediction unit 81412 or the prediction process unit 8141 may select an appropriate intra prediction mode from the various intra prediction modes. The intra prediction unit 81412 may encode the current block unit using a cross component prediction mode to predict one of the two chroma components of the current block unit based on the luma components of the current block unit. The intra prediction unit 81412 may predict a first one of the two chroma components of the current block unit based on the second of the two chroma components of the current block unit.

In at least one implementation, the inter prediction unit 81413 may inter predict the current block unit as an alternative to the intra prediction performed by the intra prediction unit 81412. The inter prediction unit 81413 may perform motion estimation to estimate motion of the current block unit for generating a motion vector.

The motion vector may indicate a displacement of the current block unit within the current image block relative to a reference block unit within a reference image block. The inter prediction unit 81413 may receive at least one reference image block stored in the decoded picture buffer 8147 and estimate the displacement based on the received reference image blocks to generate the motion vector.

In at least one implementation, the first summer 8142 may generate the residual block by subtracting the prediction block determined by the prediction process unit 8141 from the original current block unit. The first summer 8142 may represent the component or components that perform this subtraction operation.

In at least one implementation, the transform/quantization unit 8143 may apply a transform to the residual block in order to generate a residual transform coefficient and then quantize the residual transform coefficients to further reduce bit rate. The transform may be one of a DCT, DST, AMT, MDNSST, HyGT, signal dependent transform, KLT, wavelet transform, integer transform, sub-band transform or a conceptually similar transform.

In at least one implementation, the transform may convert the residual information from a pixel value domain to a transform domain, such as a frequency domain. The degree of quantization may be modified by adjusting a quantization parameter.

In at least one implementation, the transform/quantization unit 8143 may perform a scan of the matrix including the quantized transform coefficients. Alternatively, the entropy encoding unit 8148 may perform the scan.

In at least one implementation, the entropy encoding unit 8148 may receive a plurality of syntax elements from the prediction process unit 8141 and the transform/quantization unit 8143 including a quantization parameter, transform data, motion vectors, intra modes, partition information, and other syntax information. The entropy encoding unit 8148 may encode the syntax elements into the bitstream.

In at least one implementation, the entropy encoding unit 8148 may entropy encode the quantized transform coefficients by performing CAVLC, CABAC, SBAC, PIPE coding or another entropy coding technique to generate an encoded bitstream. The encoded bitstream may be transmitted to another device (second electronic device 120 in FIG. 1) or archived for later transmission or retrieval.

In at least one implementation, the inverse quantization/inverse transform unit 8144 may apply inverse quantization and inverse transformation to reconstruct the residual block in the pixel domain for later use as a reference block. The second summer 8145 may add the reconstructed residual block to the prediction block provided from the prediction process unit 8141 in order to produce a reconstructed block for storage in the decoded picture buffer 8147.

In at least one implementation, the filtering unit 8146 may include a deblocking filter, a SAO filter, a bilateral filter, and/or an ALF to remove blocking artifacts from the reconstructed block. Additional filters (in loop or post loop) may be used in addition to the deblocking filter, the SAO filter, the bilateral filter and the ALF. Such filters are not shown for brevity and may filter the output of the second summer 8145.

In at least one implementation, the decoded picture buffer 8147 may be a reference picture memory that stores the reference block for use by the encoder module 114 to encode video, such as in intra or inter coding modes. The decoded picture buffer 8147 may include a variety of memory devices such as DRAM, including SDRAM, MRAM, RRAM), or other types of memory devices. The decoded picture buffer 8147 may be on-chip with other components of the encoder module 114 or off-chip relative to those components.

In at least one implementation, the encoder module 114 may perform the example reconstruction methods 300 and 700 for reconstructing a block unit as shown in FIGS. 3 and 7. The methods 300 and 700 may be performed using the configurations illustrated in FIG. 1 and FIG. 8 and various elements of these figures are referenced in explaining the methods 300 and 700. Each block shown in FIGS. 3 and 7 may represent one or more processes, methods, or subroutines performed. Furthermore, the order of blocks is illustrative only and may change. Additional blocks may be added or less blocks may be utilized without departing from the present disclosure.

At blocks 310 and 710, an encoder module receives an image frame of video data and determines a block unit from the image frame according to the received video data. The video data may be a video.

In at least one implementation, with reference to FIGS. 1 and 8, the first electronic device 110 may receive the video via the source module 112. The encoder module 114 may determine the image frame from the video and divide the image frame to determine the block unit.

In at least one implementation, the prediction process unit 8141 of the first electronic device 110 may determine the block unit from the video via the partition unit 81411 and the encoder module 114 may provide a plurality of partition indications into a bitstream based on a partition result of the partition unit 81411.

At blocks 320 and 720, the encoder module 114 derives a plurality of model parameters based on motion information of a plurality neighboring blocks neighboring the block unit.

In at least one implementation, with reference to FIG. 8, the encoder module 114 may determine a plurality of neighboring blocks neighboring the block unit. The encoder module 114 may select the neighboring blocks based on a plurality of predefined positions relative to the block unit to receive the motion information of the selected neighboring blocks.

In at least one implementation, with reference to FIG. 4A, the encoder module 114 may receive a plurality of reference vectors V0-V2 from the motion information. The number of the reference vectors may be equal to three.

In at least one implementation, the encoder module 114 may derive a vector model including the model parameters based on the motion information of the neighboring blocks. The vector model may be an affine motion model.

At blocks 330 and 730, the encoder module 114 derives, for a sub-block in the block unit, an intermediate block based on the plurality of model parameters.

In at least one implementation, with reference to FIGS. 4B and 8, the encoder module 114 may divide the block unit 400-B to generate a plurality of sub-blocks 401-416. Each of the sub-blocks 401-416 may have a sub-block vector derived based on the vector model including the model parameters.

In at least one implementation, the encoder module 114 may determine a sub-block location (Lx, Ly) for a specific one of the sub-blocks and substitute the sub-block location (Lx, Ly) into the vector model V (x, y)=(Vx (x, y), Vy (x, y)) to generate a specific one of the sub-block vectors Vsb (Vx (x, y), Vy (x, y)) corresponding to the specific sub-block. Thus, the encoder module 114 may predict the specific sub-block based on the specific sub-block vector Vsb (Lx, Ly) to generate the intermediate block.

At blocks 340 and 740, the encoder module 114 determines a vector formula based on the model parameters.

In at least one implementation, with reference to FIG. 8, the encoder module 114 determines the vector formula based on the model parameters of the vector model. In at least one implementation, the vector formula of the block unit may be derived as follows:

$$\begin{cases} \Delta Vx(i, j) = C \times dx(i, j) + D \times dy(i, j) \\ \Delta Vy(i, j) = E \times dx(i, j) + F \times dy(i, j) \end{cases}$$

where dx (i, j) and dy (i, j) represents horizontal and vertical offsets from the sample location (i,j) to the center of the subblock, $\Delta V(i, j) = (\Delta Vx (i, j), \Delta Vy (i, j))$ represents a vector difference and the parameters C-F are derived based on the model parameter of the vector model.

In at least one implementation, the parameters C-F may be equal to the four model parameters (Vx1−Vx0)/w, (Vx2−Vx0)/h, (Vy1−Vy0)/w and (Vy2−Vy0)/h when the vector model is the six-parameter affine motion model. In at least one implementation, the parameters C and F may be equal to the model parameters (Vx1−Vx0)/w and the parameters E and (−D) may be equal to the model parameters (Vy1−Vy0)/w when the vector model is the four-parameter affine motion model.

At block 350, the encoder module 114 calculates at least one vector value based on the vector formula for at least one sampling position in the sub-block. At block 750, the encoder module 114 selects a sampling position in the sub-block and calculates a vector value based on the sampling position.

In at least one implementation, with reference to FIGS. 5 and 8, the encoder module 114 may select the sampling positions in the sub-block 401. The encoder module 114 may arbitrarily select N sampling positions and determine coordinates of the selected N sampling positions based on two axes 541, 542. The encoder module 114 may determine the vector values based on the vector formula for the coordinates of the selected N sampling positions. In at least one implementation, the number N may be a positive integer. The selected N sampling positions may be four sampling positions respectively located at four different quadrants generated by dividing the sub-block 401 by the two axes 541, 542.

In at least one implementation, the encoder module 114 may generate one or two vector values for each of the at least one sampling position since the vector formula includes two vector equation $\Delta Vx$ (i, j) and $\Delta Vy$ (i, j). In at least one implementation, the at least one vector value may be determined based on absolute operation. The at least one vector value may be equal to a sum of a first absolute value of C×i and a second absolute value of D×j when the at least one vector value is determined based on the vector equation $\Delta Vx$ (i, j).

At a first combination of blocks 360 and 370 and a second combination of blocks 760 and 770, the encoder module 114 compares the at least one vector value with a threshold, and determines whether the intermediate block is adjusted based on the vector formula to generate a predicted block.

In at least one implementation, with reference to FIG. 2, the encoder module 114 may determine the threshold for comparing with the at least one vector value. In at least one implementation, the threshold may be determined based on a rounding parameter.

In at least one implementation, a component vector of a block component, generated based on the vector formula, in the sub-block may be rounded by right shifting by S bits. Thus, a specific one of two directional vectors in the component vector may be rounded down to be equal to zero when the specific directional vector is greater than or equal to −(1<<(S−1)) and less than or equal to 1<<(S−1). The threshold may be equal to 2(S−1) when the rounding parameter is equal to S. In at least one implementation, in order to further decrease the possibility of adjusting the intermediate block, the threshold may be further multiplied by a positive number M.

In at least one implementation, the component vector may be rounded by a divisor D. Thus, the specific directional vector may be rounded down to be equal to zero when the specific directional vector is greater than or equal to −D/2 and less than or equal to D/2. The threshold may be equal to D/2 when the rounding parameter is equal to the divisor D. In at least one implementation, in order to further decrease the possibility of adjusting the intermediate block, the threshold may be further multiplied by the positive number M.

In at least one implementation, the encoder module 114 may determine that the predicted block is generated for the intermediate block when the vector value is greater than the threshold. In another implementation, the predicted block may be identical to the intermediate block due to the zero-vector difference when the vector value is less than or equal to the threshold. Thus, the encoder module 114 may determine that the predicted block is not generated when the vector value is less than or equal to the threshold.

In at least one implementation, the vector value generated for the selected sampling position may be less than the maximum of the vector values generated for the sampling positions located at all of the block components when the distance between the selected sampling position and the intersection point of the axes 541, 542 is less than the distance between the component corners and the intersection point. Some of the adjustment to the intermediate components in the intermediate block may be bypassed so the coding efficiency may be decreased. However, the possibility of the adjustment is decreased so the coding speed may be increased.

At blocks 380 and 790, the encoder module 114 reconstructs the sub-block based on the predicted block.

In at least one implementation, with reference to FIG. 8, the first summer 8142 of the encoder module 114 in the source device 110 may generate a residual block based on the predicted block and provide a bitstream to the second electronic device 120 including a plurality of coefficients corresponding to a plurality of residual components in the residual block, since the intermediate block is adjusted. In at least one implementation, an intermediate component 6511 of an intermediate block 651 may be determined based on the sub-block vector 421 for the block component 5011 of the sub-block 401. The vector difference 681 of the intermediate block 651 may be determined based on the vector formula, so a predicted component 6611 of a predicted block 661 is determined based on a predicted vector 6711 generated by adding the vector difference 681 into the sub-block vector 421.

In at least one implementation, the encoder module 114 may reconstruct the sub-block 401 based on the predicted block for predicting the other block units in the image frame for predicting the image frame and the video. The sub-block 401 may be reconstructed by adding the predicted block into the residual block of the sub-block.

At blocks 390 and 780, the encoder module 114 reconstructs the sub-block based on the intermediate block.

In at least one implementation, with reference to FIG. 8, the first summer 8142 of the encoder module 114 in the source device 110 may generate the residual block based on the intermediate block and provide the bitstream to the second electronic device 120 including the coefficients corresponding to the residual components, since the intermediate block is not adjusted.

In at least one implementation, the encoder module 114 may reconstruct the sub-block 401 based on the intermediate block for predicting the other block units in the image frame for predicting the image frame and the video. The sub-block 401 may be reconstructed by adding the intermediate block into the residual block of the sub-block.

The described implementations are to be considered in all respects as illustrative and not restrictive. It should also be understood that the present disclosure is not limited to the particular implementations described above but that many rearrangements, modifications, and substitutions are possible without departing from the scope of the present disclosure.

What is claimed is:

1. A method of decoding a bitstream by an electronic device, the method comprising:
    receiving an image frame of the bitstream;
    determining a block unit from the received image frame;
    deriving a plurality of model parameters based on motion information of a plurality of neighboring blocks neighboring the block unit;
    deriving, for a sub-block in the block unit, an intermediate block based on the plurality of model parameters;
    determining a vector formula based on the plurality of model parameters;
    calculating at least one vector value based on the vector formula for at least one sampling position in the sub-block;
    comparing the at least one vector value with a threshold;
    determining, based on the comparing, whether the intermediate block is adjusted;
    generating a predicted block based on the vector formula when the intermediate block is adjusted; and
    reconstructing the sub-block based on the predicted block.

2. The method according to claim 1, further comprising:
    reconstructing the sub-block by adding the predicted block into a residual block of the sub-block, when each of the at least one vector value is greater than the threshold; and
    reconstructing the sub-block by adding the intermediate block into the residual block, when one of the at least one vector value is less than or equal to the threshold.

3. The method according to claim 1, further comprising:
    reconstructing the sub-block by adding the predicted block into a residual block of the sub-block, when one of the at least one vector value is greater than the threshold; and
    reconstructing the sub-block by adding the intermediate block into the residual block, when each of the at least one vector value is less than or equal to the threshold.

4. The method according to claim 1, wherein the at least one sampling position is a plurality of corners of the sub-block.

5. The method according to claim 1, wherein the plurality of model parameters includes a plurality of numbers A and B, the vector formula includes a vector function $V(i, j)=Ai+Bj$, and one of the at least one vector value is equal to a sum of a first absolute value of $A \times P$ and a second absolute value of $B \times Q$ when one of the at least one sampling position is determined as $(P, Q)$.

6. The method according to claim 1, further comprising:
    determining, based on the vector formula, a plurality of component vectors for a plurality of block components in the sub-block when the intermediate block is adjusted;
    rounding down the plurality of component vectors based on a rounding parameter; and
    further adjusting the intermediate block based on the plurality of rounded component vectors.

7. The method according to claim 6, wherein the threshold is determined based on the rounding parameter.

8. An electronic device for decoding a bitstream, the electronic device comprising:
    at least one processor; and
    a storage device coupled to the at least one processor and storing a plurality of instructions which, when executed by the at least one processor, causes the at least one processor to:
    receive an image frame of the bitstream;
    determine a block unit from the received image frame;
    derive a plurality of model parameters based on motion information of a plurality of neighboring blocks neighboring the block unit;
    derive, for a sub-block in the block unit, an intermediate block based on the plurality of model parameters;
    determine a vector formula based on the plurality of model parameters;

calculate at least one vector value based on the vector formula for at least one sampling position in the sub-block;

compare the at least one vector value with a threshold;

determine, based on the comparing, whether the intermediate block is adjusted;

generate a predicted block based on the vector formula when the intermediate is adjusted; and reconstruct the sub-block based on the predicted block.

9. The electronic device according to claim 8, wherein the plurality of instructions, when executed by the at least one processor, further causes the at least one processor to:

reconstruct the sub-block by adding the predicted block into a residual block of the sub-block, when the at least one vector value is greater than the threshold; and reconstruct the sub-block by adding the intermediate block into the residual block, when the at least one vector value is less than or equal to the threshold.

10. The electronic device according to claim 8, wherein the at least one sampling position is a plurality of corners of the sub-block.

11. The electronic device according to claim 8, wherein the plurality of model parameters includes a plurality of numbers A and B, the vector formula includes a function V (i, j)=Ai+Bj, and a specific one of the at least one vector value is equal to a sum of a first absolute value of A×P and a second absolute value of B×Q when a corresponding one of the at least one sampling position is determined as (P, Q).

12. The electronic device according to claim 8, wherein the plurality of instructions, when executed by the at least one processor, further causes the at least one processor to:

determine, based on the vector formula, a plurality of component vectors for a plurality of block components in the sub-block when the intermediate block is determined to be adjusted;

round down the plurality of component vectors based on a rounding parameter; and adjust the intermediate block based on the plurality of rounded component vectors.

13. The method according to claim 12, wherein the threshold is determined based on the rounding parameter.

14. The method according to claim 13, wherein the threshold is equal to $2^{N-1}$ when the plurality of component vectors is rounded down by right shifting N in bit operation.

15. A method of decoding a bitstream by an electronic device, the method comprising:

receiving an image frame of the bitstream;

determining a block unit from the received image frame;

deriving a plurality of model parameters based on motion information of a plurality of neighboring blocks neighboring the block unit;

deriving, for a sub-block in the block unit, an intermediate block based on the plurality of model parameters;

determining a vector formula based on the plurality of model parameters;

selecting a sampling position in the sub-block and calculating a vector value based on the sampling position;

adjusting the intermediate block based on the vector formula to generate a predicted block when the vector value is greater than a threshold; and reconstructing the sub-block based on the predicted block.

16. The method according to claim 15, further comprising:

reconstructing the sub-block by adding the predicted block into a residual block of the sub-block, when the vector value is greater than the threshold; and reconstructing the sub-block by directly adding the intermediate block into the residual block without adjusting the intermediate block, when the vector value is less than or equal to the threshold.

17. The method according to claim 15, wherein the sampling position is one of a plurality of corners of the sub-block.

18. The method according to claim 15, wherein the plurality of model parameters includes a plurality of numbers A and B, the vector formula includes a vector function V (i, j)=Ai+Bj, and the vector value is equal to a sum of a first absolute value of A×P and a second absolute value of B×Q when the sampling position is determined as (P, Q).

19. The method according to claim 15, further comprising:

determining, based on the vector formula, a plurality of component vectors for a plurality of block components in the sub-block when the intermediate block is determined to be adjusted;

rounding down the plurality of component vectors based on a rounding parameter; and adjusting the intermediate block based on the plurality of rounded component vectors.

20. The method according to claim 19, wherein the threshold is equal to $2^{N-1}$ when the plurality of component vectors is rounded down by right shifting N in bit operation.

* * * * *